(12) United States Patent
Kiest, Jr.

(10) Patent No.: US 7,845,372 B2
(45) Date of Patent: Dec. 7, 2010

(54) BLADDERLESS PIPELINER AND METHOD FOR USING SAME

(75) Inventor: Larry W. Kiest, Jr., Ottawa, IL (US)

(73) Assignee: LMK Enterprises, Inc., Ottawa, IL (US)

( * ) Notice: Subject to any disclaimer, the term of this patent is extended or adjusted under 35 U.S.C. 154(b) by 919 days.

(21) Appl. No.: 11/694,206

(22) Filed: Mar. 30, 2007

(65) Prior Publication Data

US 2008/0236692 A1    Oct. 2, 2008

(51) Int. Cl.
*F16L 55/16* (2006.01)

(52) U.S. Cl. ............... 138/98; 138/97; 264/269; 264/516; 156/287

(58) Field of Classification Search .............. 138/98, 138/97; 264/269, 516, 287; 156/94, 287, 156/294, 574; 405/150.1
See application file for complete search history.

(56) References Cited

U.S. PATENT DOCUMENTS

| | | | |
|---|---|---|---|
| 3,914,825 A | 10/1975 | Reynolds | 24/115 R |
| 4,207,130 A | 6/1980 | Barber | 156/244.13 |
| 4,350,548 A | 9/1982 | Zenbayashi et al. | 156/156 |
| 4,366,012 A | 12/1982 | Wood | 156/93 |
| 4,685,983 A | 8/1987 | Long, Jr. | 156/64 |
| 4,752,511 A | 6/1988 | Driver | 428/36.1 |
| 4,778,553 A | 10/1988 | Wood | 156/287 |
| 4,836,715 A | 6/1989 | Wood | 405/150.1 |
| 4,991,006 A * | 2/1991 | Wood | 348/84 |
| 5,044,405 A | 9/1991 | Driver et al. | 138/98 |
| 5,049,003 A | 9/1991 | Barton | 405/184.1 |
| 5,108,533 A | 4/1992 | Long, Jr. et al. | 156/294 |
| 5,154,936 A | 10/1992 | Driver et al. | 425/182 |
| 5,167,258 A | 12/1992 | Rice | 138/98 |
| 5,199,463 A | 4/1993 | Lippiatt | 138/98 |
| 5,280,811 A | 1/1994 | Catallo et al. | 138/98 |
| 5,329,063 A | 7/1994 | Endoh | 138/98 |
| 5,384,086 A | 1/1995 | Smith | 138/98 |
| 5,388,616 A | 2/1995 | Muller et al. | 138/98 |
| 5,393,481 A | 2/1995 | Wood | 264/516 |

(Continued)

FOREIGN PATENT DOCUMENTS

DE    298 02 675 U 1    9/1998

(Continued)

OTHER PUBLICATIONS

International Search Report, LMK Enterprises, Inc., PCT/US2008/058693, 2 pages, Apr. 20, 2009.

*Primary Examiner*—Patrick F Brinson
(74) *Attorney, Agent, or Firm*—McKee, Voorhees & Sease, P.L.C.

(57) ABSTRACT

A lining apparatus and method is provided that obviates the need for a bladder to press the liner against the host pipe. The lining apparatus may include an extension tube sealed to the liner at one of its ends with an inversion mechanism attached to the other end of the liner for inverting the liner to its desired position within the pipe to be repaired. The lining apparatus can also avoid the use of an extension tube by temporarily closing the liner during the inversion process so that the liner can be inflated when pressurized by a fluid and then sealing an open end of the liner after it has been inverted into the pipe.

43 Claims, 14 Drawing Sheets

U.S. PATENT DOCUMENTS

| | | | |
|---|---|---|---|
| 5,403,120 A | 4/1995 | Stekette, Jr. | 405/184.2 |
| 5,407,630 A | 4/1995 | Smith | 264/516 |
| 5,409,561 A | 4/1995 | Wood | 156/287 |
| 5,439,033 A | 8/1995 | Kamiyama et al. | 138/98 |
| 5,454,401 A | 10/1995 | Kamiyama et al. | 138/98 |
| 5,494,118 A | 2/1996 | Wood | 175/22 |
| 5,510,078 A | 4/1996 | Smith et al. | 264/516 |
| 5,546,992 A | 8/1996 | Chick et al. | 138/98 |
| D373,408 S | 9/1996 | Wood | D23/260 |
| 5,566,719 A | 10/1996 | Kamiyama et al. | 138/98 |
| 5,577,864 A | 11/1996 | Wood et al. | 405/184.2 |
| 5,597,353 A | 1/1997 | Alexander, Jr. | 425/387.1 |
| 5,598,873 A | 2/1997 | Kamiyama et al. | 138/98 |
| 5,609,439 A * | 3/1997 | Schreiner et al. | 405/184.2 |
| 5,624,629 A | 4/1997 | Wood | 264/516 |
| 5,655,283 A | 8/1997 | Driver et al. | 5/618 |
| 5,656,117 A | 8/1997 | Wood et al. | 156/287 |
| 5,692,543 A | 12/1997 | Wood | 138/98 |
| 5,706,861 A | 1/1998 | Wood et al. | 138/98 |
| 5,736,166 A | 4/1998 | Polivka | 425/11 |
| 5,737,822 A | 4/1998 | Driver et al. | 29/450 |
| 5,743,299 A | 4/1998 | Chick et al. | 138/98 |
| 5,778,938 A | 7/1998 | Chick et al. | 138/98 |
| 5,816,293 A | 10/1998 | Kiest, Jr. | 138/98 |
| RE35,944 E | 11/1998 | Driver et al. | 264/570 |
| 5,915,419 A | 6/1999 | Tweedie et al. | 138/98 |
| 5,919,327 A | 7/1999 | Smith | 156/245 |
| 5,927,341 A | 7/1999 | Taylor | 138/98 |
| 5,942,183 A | 8/1999 | Alexander, Jr. | 264/516 |
| 5,950,682 A | 9/1999 | Kiest, Jr. | 138/98 |
| 5,960,882 A | 10/1999 | Polivka | 166/297 |
| 5,975,878 A | 11/1999 | Wood et al. | 425/503 |
| 6,001,212 A | 12/1999 | Polivka et al. | 156/287 |
| 6,021,815 A | 2/2000 | Kiest, Jr. et al. | 138/98 |
| 6,029,726 A | 2/2000 | Tweedie et al. | 156/423 |
| 6,039,079 A | 3/2000 | Kiest, Jr. | 138/98 |
| 6,044,867 A | 4/2000 | Tweedie et al. | 138/98 |
| 6,068,725 A | 5/2000 | Tweedie et al. | 156/287 |
| 6,093,363 A | 7/2000 | Polivka | 264/516 |
| 6,103,046 A | 8/2000 | Smith | 156/245 |
| 6,117,507 A | 9/2000 | Smith | 428/36.9 |
| 6,123,110 A | 9/2000 | Smith et al. | 138/98 |
| 6,146,491 A | 11/2000 | Wood et al. | 156/344 |
| 6,199,591 B1 | 3/2001 | Kiest, Jr. et al. | 138/98 |
| 6,337,114 B1 | 1/2002 | Wood et al. | 428/36.9 |
| 6,354,330 B1 | 3/2002 | Wood | 138/97 |
| 6,520,719 B1 | 2/2003 | Tweedie et al. | 405/184.2 |
| 6,539,979 B1 | 4/2003 | Driver | 138/98 |
| 6,612,340 B1 | 9/2003 | Lause | 138/98 |
| 6,679,293 B2 | 1/2004 | Driver | 138/98 |
| 6,682,668 B1 | 1/2004 | Driver et al. | 264/35 |
| 6,708,728 B2 | 3/2004 | Driver et al. | 138/98 |
| 6,899,832 B2 | 5/2005 | Wood | 264/36.17 |
| 6,923,217 B2 | 8/2005 | Smith | 138/98 |
| 6,932,116 B2 | 8/2005 | Smith et al. | 138/98 |
| 6,953,306 B2 | 10/2005 | McGillis | 405/184 |
| 6,969,216 B2 | 11/2005 | Driver | 405/184.2 |
| 7,108,456 B2 | 9/2006 | Driver et al. | 405/184.2 |
| 7,112,254 B1 | 9/2006 | Driver | 156/285 |
| 7,311,121 B2 | 12/2007 | Kamiyama et al. | 138/98 |
| 2005/0211372 A1 | 9/2005 | Wood | 156/287 |
| 2008/0029177 A1 | 2/2008 | Kamiyama et al. | 138/98 |

FOREIGN PATENT DOCUMENTS

| | | |
|---|---|---|
| EP | 0 640 787 A1 | 1/1995 |
| WO | WO 97/35707 | 10/1997 |
| WO | WO 97/47462 | 12/1997 |

* cited by examiner

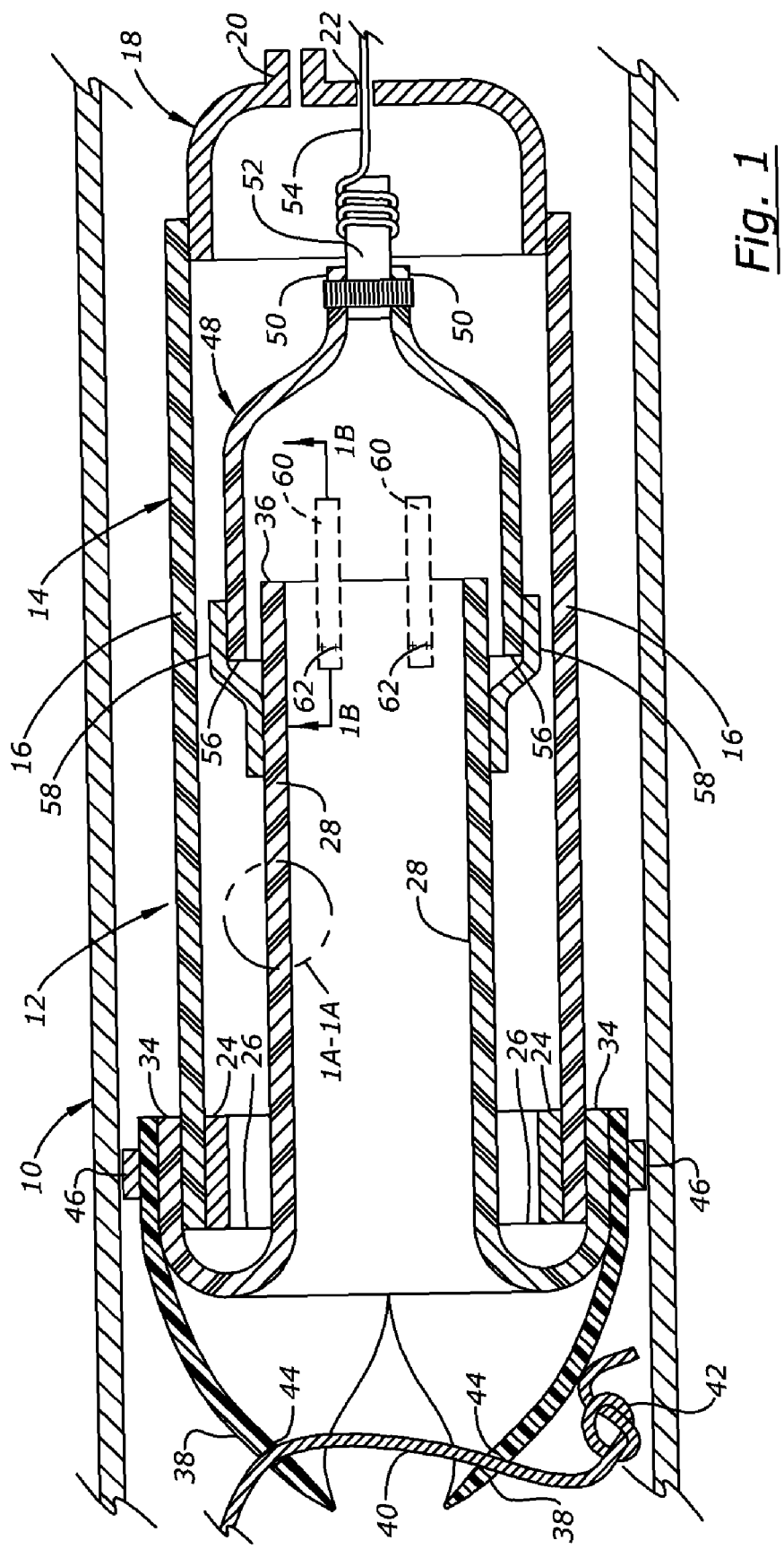

BLADDERLESS PIPELINER AND METHOD FOR USING SAME

BACKGROUND OF THE INVENTION

The present invention relates to a bladderless pipeliner and method for using same. Prior apparatus and methods for repairing pipelines have included an inversion bladder tube as well as a felt liner tube. The liner tube is positioned inside the bladder tube and the action of the bladder tube during inversion causes the liner and the bladder tube to invert together. Once the inversion is complete the bladder that was originally on the outside of the liner is reversed to be on the inside, and the liner which was originally inside the bladder has been reversed to be outside the bladder. The bladder is then inflated to press the liner against the sewer pipe wall. These two together may be referred to as a liner/bladder assembly.

In these prior art liner/bladder assemblies, the bladder is longer than the liner. The end of the bladder includes a wick and a source of vacuum for facilitating the introduction of resin into the bladder tube to cause impregnation of the liner tube. Since the bladder is longer than the liner, the bladder continues to invert a short distance even when the liner is fully inverted. The bladder portion that extends past the end of the liner keeps the end of the liner open so there is no need to cut the end of the liner.

The bladder material used in the prior art has sometimes been made of reinforced urethane. Urethane withstands heat generated during curing of the resin. Urethane also has an excellent stretch characteristic and that is important for the bladder to be sized somewhat smaller than the host pipe. The bladder and liner then both stretch under pressure leaving a smooth bore interior of the newly cured-in-place liner.

The urethane bladder is very expensive. It represents approximately 60% of the liner/bladder assembly in raw material cost. Bladder material must be slit into the appropriate lay flat size. It is then welded into a tube and air tested for leaks and burst pressure. Then the liner tube is pulled inside of the bladder tube and this can be a difficult task, especially if the lengths are long. The bladder tube must be laid out straight with a rope passing through it so that the liner can be pulled through the bladder. If the liner is 200 feet long the manufacturing facility must have an assembly table that is at least 200 feet long also.

Therefore, a primary object of the present invention is the provision of an improved bladderless pipeliner and method for using same.

A further object of the present invention is the use of a bladderless pipeliner which does not include an inversion bladder.

A further object of the present invention is the provision of an apparatus and method which are economical to use, efficient in operation, and durable after installing.

BRIEF SUMMARY OF THE INVENTION

The foregoing objects may be achieved by an apparatus for repairing a pipeline comprising an elongated liner tube having a liner tube wall comprised of a resin absorbent material. The liner tube includes at least first and second ends. The liner tube wall includes first and second opposite wall surfaces. An uncured and unhardened resin impregnates the resin absorbent material of the liner tube wall. An extension tube is provided having a tube shaped open end and a close end. A sealing member detachably secures the tube shaped open end of the extension tube to the first end of the liner tube and forms a substantially fluid tight seal therebetween. A flexible pulling line is connected to the closed end of the bladder extension.

Inversion means are connected to the second end of the liner tube for inverting the liner tube from an initial position wherein the first wall surface of the liner tube wall is facing in an inward radial direction and the second wall surface of the liner tube is facing in an outward radial direction to an inverted position wherein the first wall surface faces in an outward radial direction and the second wall faces in an inward radial direction.

The term "inversion means" as used herein includes various apparatus shown in the prior art for inverting liner tubes into a pipeline. Examples are shown in U.S. Pat. No. 5,816,293, which shows various embodiments of apparatus for inverting the liner tubes. Another reference, U.S. Pat. No. 6,021,815, shows various types of launcher devices which may be used for repairing a main sewer line or a lateral sewer line, and which will accommodate either elongated cylindrical liner tubes or T-shaped liner tubes. U.S. Pat. Nos. 5,950,682 and 6,039,079 show metal launcher devices which may be used as inversion means. The term inversion means also includes the launcher as shown in FIGS. 1-4 of the present application and the inverter tank shown in FIGS. 10 and 11. Other apparatus for inverting the liner tube, either into the main line or into the lateral line are included in the term "inversion means".

According to a further feature of the present invention, a metal launcher is utilized and includes an inflatable cuff between the launcher tube and the main liner member. A second fluid conduit is connected to the inflatable cuff for inflating the cuff and causing the cuff to exert pressure on the main liner member in an outward direction away from the launcher tube. In this configuration a lateral liner tube is connected to the main liner member to create a T-shaped configuration. The lateral liner tube is included inside the launcher tube whereas the main liner member is positioned outside the launcher tube.

According to another feature of the invention, the liner tube wall includes a plastic layer covering the outside of the liner tube when the liner tube is in its initial position and the plastic layer is positioned inside the liner tube after the liner tube is inverted to its inverted position.

The method of the present invention comprises taking the liner tube, attaching an inversion means to the first end of the liner tube, and attaching a tube-shaped end of an extension tube to a second end of the liner tube. The extension tube includes a closed end opposite from its tube shaped end. Next, a liquid uncured resin is impregnated into the absorbent material of the liner tube wall. An inversion means is then used to invert the liner tube in the pipeline from an initial position wherein the first wall surface of the liner tube faces in an inward radial direction and the second wall surface of the liner tube faces in an outer radial direction to an inverted position wherein the first wall surface of the liner faces in an outward radial direction and the second wall surface faces in an inward radial direction. The resin is then permitted to cure and harden. Finally the extension tube is pulled away from the liner tube to detach the extension tube from the liner tube.

According to another feature of the method, the attachment step comprises using a sealing member to attach the liner to the bladder extension. The step of pulling the extension tube away from the liner tube further comprises detaching the sealing member from the liner tube while keeping the sealing member attached to the bladder extension.

The present invention can also be practiced without the use of extension tube. Here, the second end of the liner tube is temporarily closed. When the liner tube is inverted, the means used to close the second end of the liner tube is blown off, leaving the liner tube fully inverted and open at its second end. Next, an inflatable plug is inserted into the open second end of the liner tube, and the plug is inflated so as to seal the second end of the liner tube.

According to another feature of the invention, the pipeline comprises a main pipeline and a lateral pipeline which form a juncture with the main pipeline. The method further comprises a main liner portion outside the launcher device and a lateral liner portion inside the launcher device before the inversion step. The inflation step further comprises inflating the main liner so as to contact the main pipe. The inversion step further comprises inverting the lateral liner portion out of the launcher device through a launcher device opening in the launcher device into the lateral pipeline.

A further feature of the invention includes a tank which is utilized as an inversion means and which contains the liner tube before the inverting step. The tank includes a tank opening and the inverting step comprises inverting the liner tube out of the tank through the tank opening.

BRIEF DESCRIPTION OF THE DRAWINGS

FIG. 1 is a sectional view of an embodiment of the present invention.

DETAILED DESCRIPTION OF THE PREFERRED EMBODIMENT

Figure 1A:
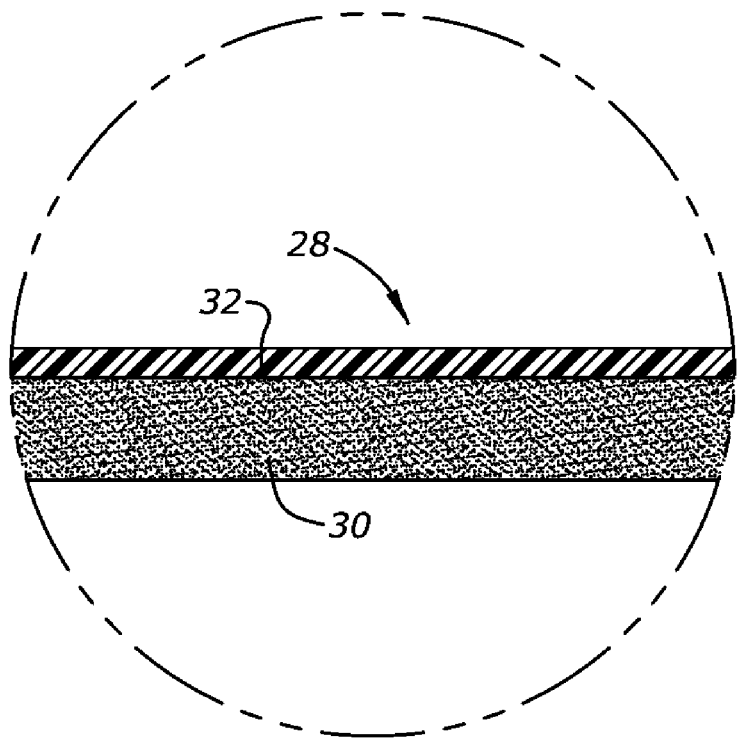
FIG. 1A is an enlarged sectional view taken along line 1A-1A of FIG. 1.

Referring to the drawings, the numeral 10 generally designates a main pipeline requiring repair. The numeral 12 refers to the apparatus for repairing the main pipeline. Apparatus 12 includes a launcher tube assembly 14 comprising a launcher tube 16 and a launcher end cap 18. End cap 18 includes a fluid inlet 20 for introducing fluid under pressure and a rope opening 22 for permitting a rope to exit through the launcher end cap. At the forward end of the launcher tube assembly 14 is a launcher collar 24 which is comprised of a rigid material such as metal. The launcher collar 24 defines a launcher tube opening 26.

Figure 1B:
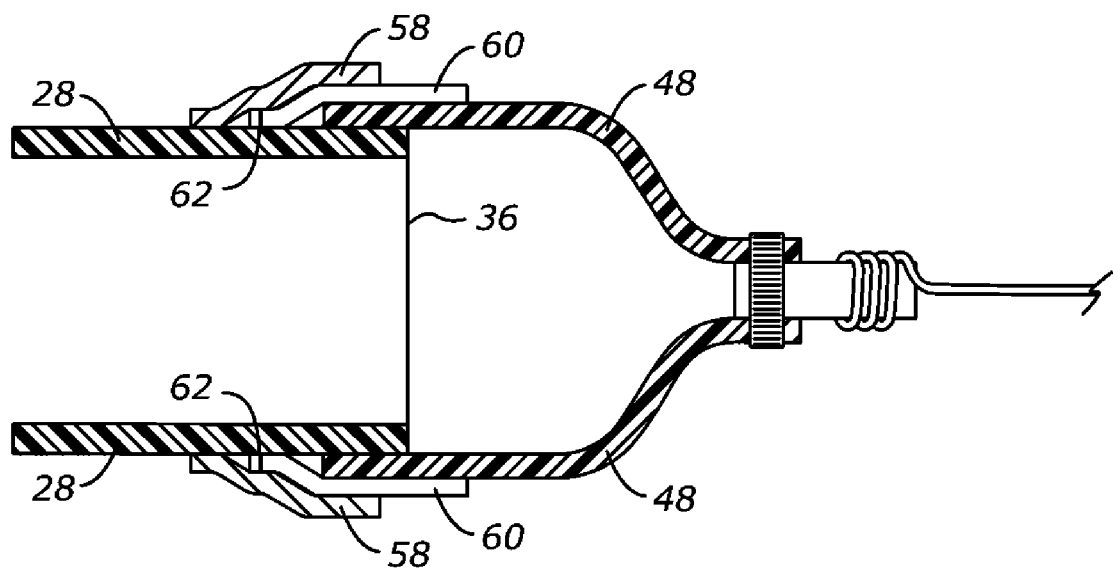
FIG. 1B is a sectional view taken line 1B-1B of FIG. 1.

A liner tube 28 is comprised of a felt material 30 and a plastic layer 32 (FIG. 1A). The felt material is adapted to absorb a liquid resin, and the plastic material is adapted to provide an impervious smooth continuous surface. In the position shown in FIGS. 1 and 1A, the plastic layer 32 is located on the outside of the liner tube 28 and the felt layer 30 is located on the inside. During the inversion process which will be described below, the liner tube is inverted so that the felt layer 30 is on the outside of the liner tube and the smooth plastic layer 32 is on the inside of the liner tube 28.

Liner tube 28 includes a first end 34 which is folded back on the outer surface of the launcher tube 12 in alignment with the rigid collar 24. A second end 36 is positioned inside the launcher tube 28. A pair of launcher flaps 38 are positioned outside the first end 34 of liner tube 28, and extend forwardly to receive a pulling line 40 through grommets 44. The pulling line 40 includes a releasable knot 42 which permits the pulling line to be removed from the device after the sewer line repair has been complete.

A clamp 46 surrounds the first end 34 of liner tube 28, the end of the launcher tube 16, and the rigid collar 24 so as to clamp those parts together.

Attached to the second end 36 of the liner tube 28 is an extension tube 48. Extension tube 48, preferably made from a flexible "lay flat" hose, includes a closed end 50 having a plug 52 therein. A flexible line 54 is attached to the plug 52 and extends through the rope opening 22 in the launcher end cap 18. The extension tube 48 also includes a tubular open end 56 which surrounds the second end 36 of liner tube 28. Use of a rigid plug 52 in the end of the extension tube 48 can, in some applications, make it difficult to navigate around bends in the pipeline 10. An alternative (not shown) is to fanfold the closed end 50 of the extension tube into several layers and put a grommet through the layers with a rope fed through the grommet.

An adhesive material 58, such as a 2-sided tape (preferably carpet tape or pressure sensitive tape) or a liquid adhesive (preferably Tetrahydrofuran (THF)) is used to attach the open end 56 of the extension tube 48 to the liner tube 28. The adhesive material 58 provides a sealed connection between the liner tube 28 and the extension tube 48. Extension tube 48 may be further attached to the liner tube by means of connecting tabs 60 which are welded to the extension tube 48, and which are attached to the felt surface 30 of the liner tube 28 by means of frangible stitches 62. The term "frangible stitches" refers to stitches which are connected to the liner tube 28, but which can be torn away by the pulling of rope 54. This further means of attaching the extension tube 48 to the liner tube 28 by using connecting tabs 60 is an added feature and is not necessary to perform the invention by using an adhesive to attach the extension tube 48 to the liner tube 28.

In operation, the liner tube 28 is impregnated with a liquid uncured resin. Resin impregnates the felt material 30, and remains in an uncured state. The liner tube 28 is then pulled within the launcher tube 12 and is transported to the location of the pipeline requiring repair. FIG. 1 illustrates the apparatus 12 located within a main sewer line 10 which requires repair.

Figure 2:
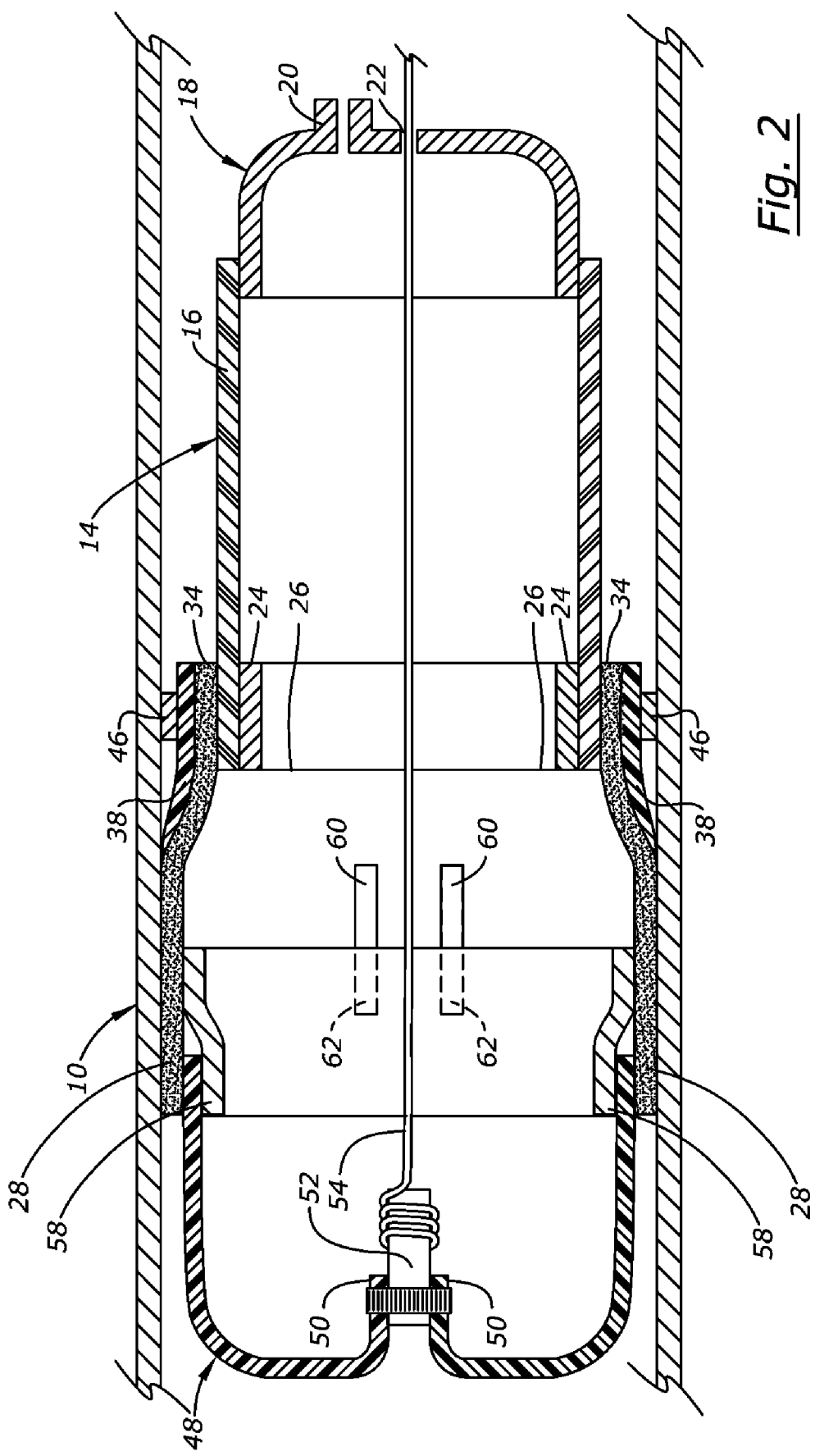
FIG. 2 is a sectional view similar to FIG. 1, but showing the liner tube in an inverted position.

FIG. 2 illustrates the apparatus in its inverted condition. The axial lengths of liner tube 28 and launcher tube 16 are shown shorter than in FIG. 1 so as to show the various layers in enlarged scale. To obtain this inversion, fluid under pressure, preferably air, is introduced through fluid inlet 20. This causes the liner tube 28 to invert outwardly through the collar 24 to the position shown in FIG. 2. The extension tube 48 also inverts outwardly, and the line 54 is permitted to extend outwardly with the inversion. In the position shown in FIG. 2, the adhesive material 58 has reversed its position, and is located inside the liner tube 28 and the extension tube 18. In FIG. 1 the adhesive material is on the outside of the liner tube 28 and the extension tube 48.

Similarly the tabs 60 are inverted from a position outside the liner tube 28 and the extension tube 48 (FIG. 1B) to an inverted position wherein one of their ends is positioned inside the liner tube 28 and the other of their ends (with stitches 62 thereon) is positioned between adhesive material 58 and liner tube 28.

Figure 3:
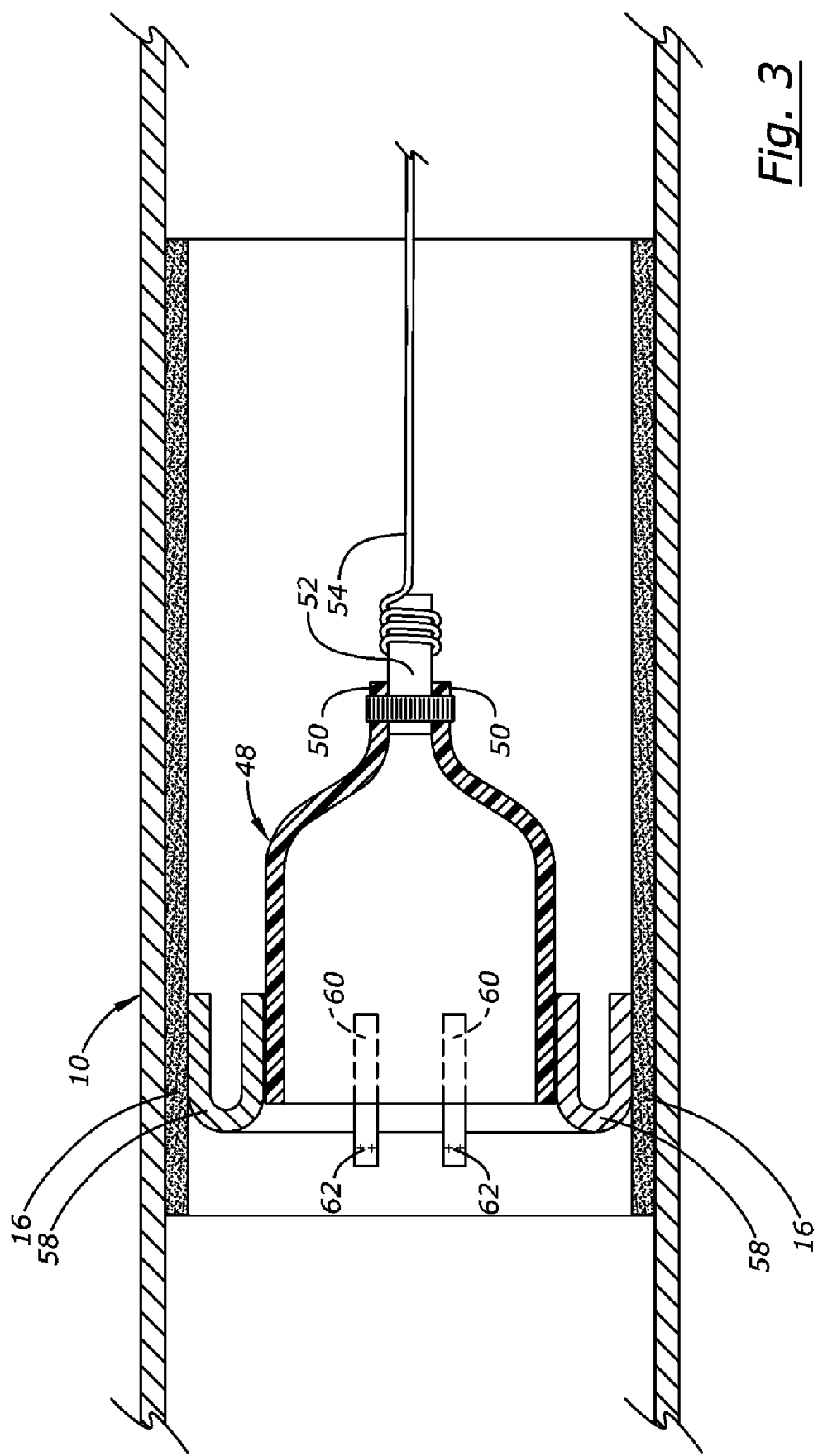
FIG. 3 is a view similar to FIG. 2, but showing the initial pulling of the extension tube to remove it from the liner tube.

After the liner tube 28 has been inverted into the main pipeline, the resin is permitted to cure and harden. The extension tube 48 preferably includes an air exhaust port that for regulating and controlling the pressure and temperature within the line 28 during the curing process. After the resin has cured and hardened, the rope 54 is pulled to cause the extension tube 48 to break away from the liner tube 28. In this break away action, the tabs 60, because of their frangible stitching 62, are easily torn away from the interior of the liner tube 28. The adhesive material 58 is shown in FIG. 3 to be folded back upon itself during the pulling action. This permits the adhesive material to peel away from the interior surface of the liner tube 28 while at the same time remaining attached to the extension tube 48.

Figure 4:
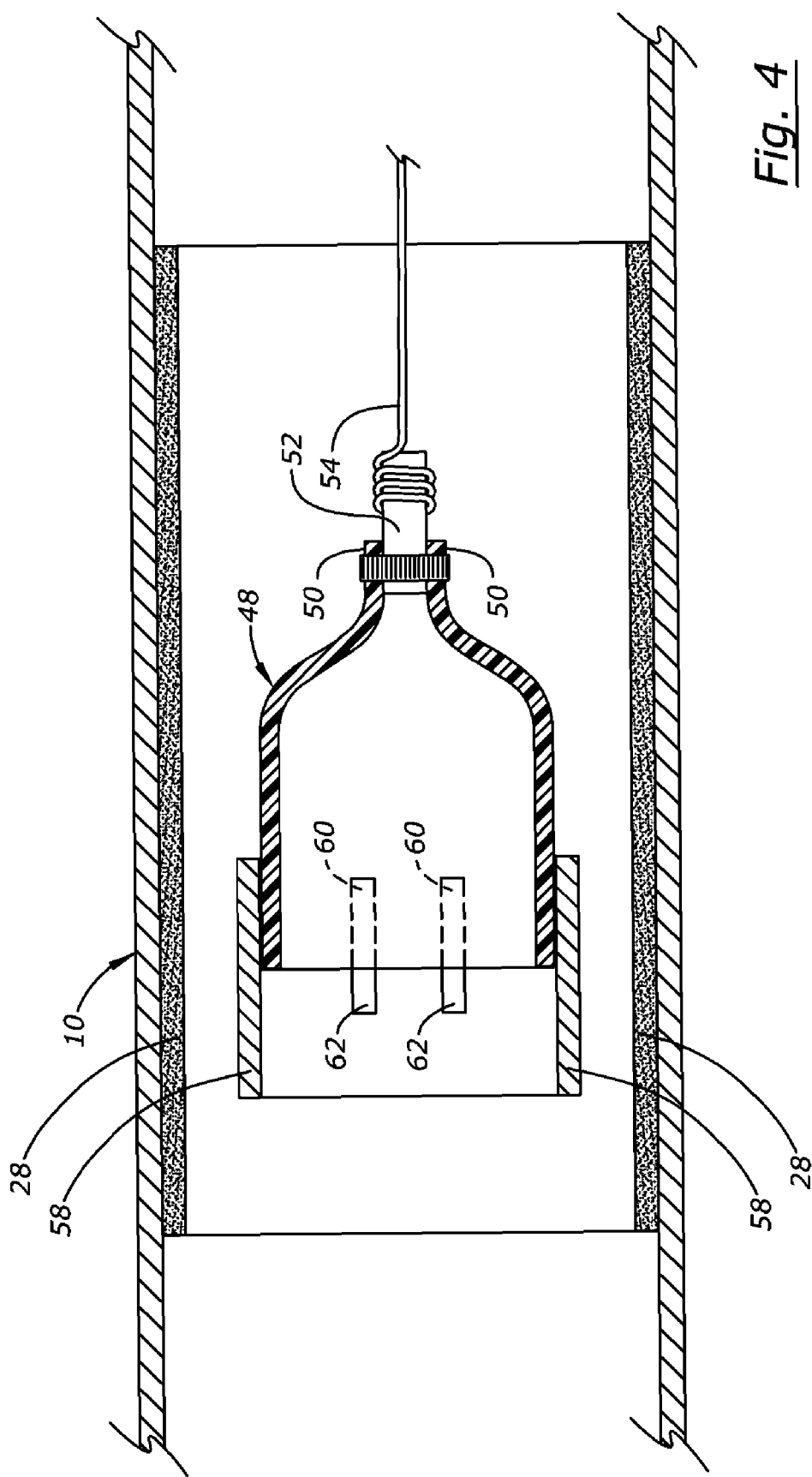
FIG. 4 is a view similar to FIG. 3 showing the extension tube completely removed from the liner tube.
Figure 5:
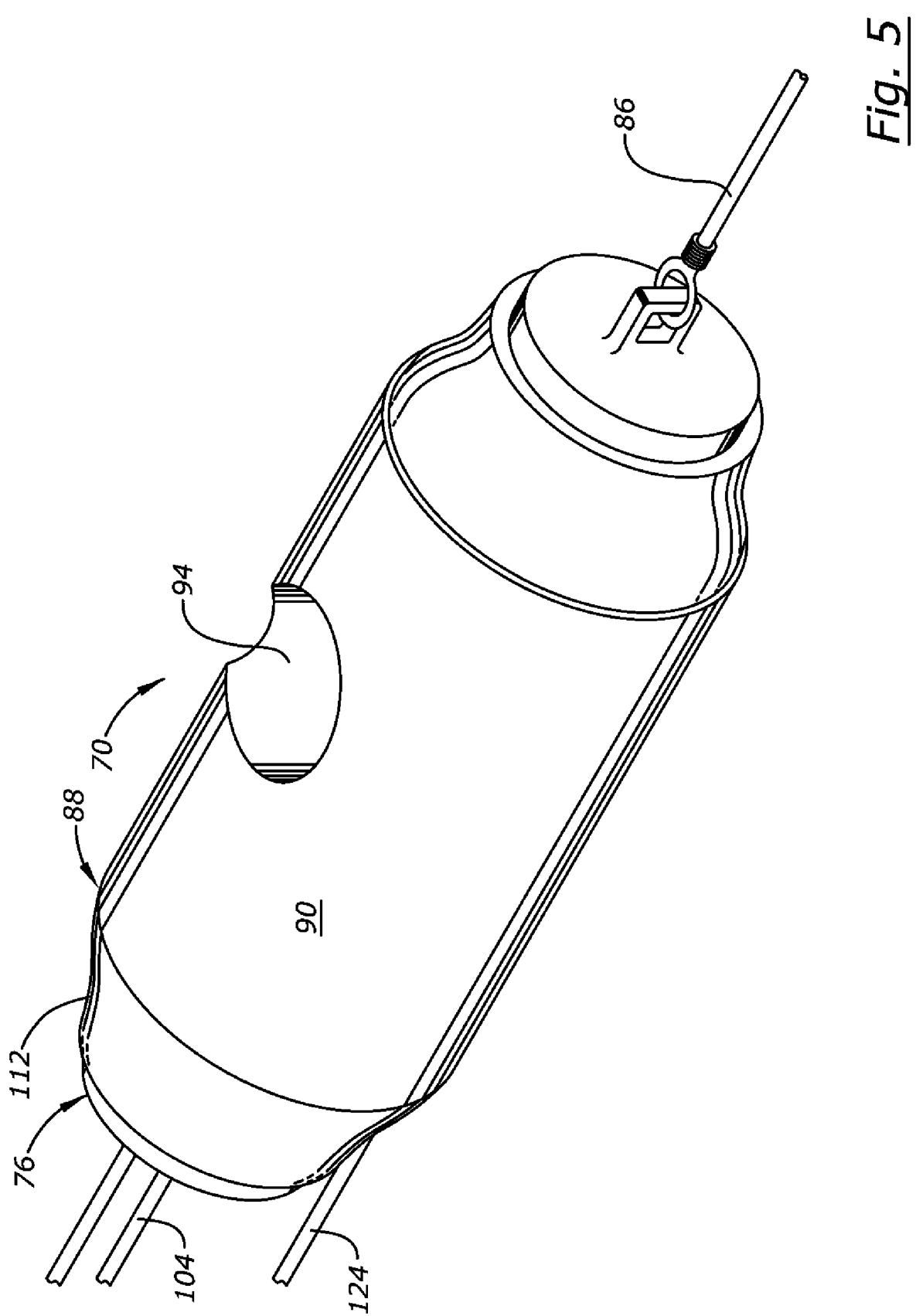
FIG. 5 is a perspective view of a modified form of the invention.

FIG. 4 illustrates the extension tube, the tabs 60, and the adhesive material 58 completely removed from the interior of the liner tube 28.

FIGS. 5-9 illustrate the use of the present bladderless liner in a T-shaped configuration for repairing a main pipeline 72 having a lateral pipeline 74 extending there from. The modified assembly is designated generally by the numeral 70. It is used for repairing a main pipeline 72 having a lateral pipeline 74 extending therefrom.

Assembly 70 includes a metal launcher tube 76 having closed opposite ends and a launcher tube opening 78 (FIG. 6) intermediate those opposite ends. At one end of the launcher tube 76 is a fluid inlet 80 having a fluid hose 81 connected thereto. A line opening 82 is adapted to receive a flexible line 104. At the opposite end of the launcher tube 76 is a grommet 84 having a pull line 86 attached thereto.

A T-shaped liner tube 88 includes a main liner member 90 (preferably a flat sheet formed in the shape of a tube) and a lateral liner tube 92 which are joined together forming a liner assembly. The liner assembly is comprised of the resin absorbent material shown in the liner assembly of FIG. 1. The main liner member 90 is positioned outside the launcher tube 76 and includes its smooth surface 32 directed inwardly towards the interior of the sewer line 72. The lateral liner tube 92 is inverted inwardly into the interior of the launcher tube 76. In this position the lateral liner tube has its smooth surface 32 facing radially outwardly and its felt surface 30 facing radially inwardly. The juncture between the main liner member 90 and the lateral liner tube 92 is provided with a main liner member opening 94.

An extension tube 96 includes a closed end 98 having a plug 100 therein. As described previously, fan folding the closed end 98 of the extension tube 96 and placing a grommet therethrough obviates the need for a plug 100 and in some instances makes it easier to navigate around bends in the pipeline. An open end 102 of the extension tube surrounds the one end of the lateral liner tube 92. A tape 106 or other adhesive material secures the two together and seals around the periphery of the open end 102. Tabs 108 are attached to the extension tube 96 and the lateral liner tube 92 in the same manner described for FIG. 1. Stitches 110 frangibly attach the tabs 108 to the liner tube 92.

Between the main liner member 90 and the steel launcher tube 76 is an inflatable cuff 112 which includes a first cuff end 114 and a second cuff end 116 which are attached to the outer surface of the metal liner tube 76. This may be done by vulcanizing, or by adhesive means, or by mechanical means such as clamps or simply friction caused by a tight fit. The cuff 112 has intermediate its opposite ends a cuff opening 118 which is folded over its cuff opening perimeter 120 and which is attached to the launcher tube opening 78 in a manner shown in FIG. 6. The cuff 112 includes at one end thereof a fluid inlet 122 to which is attached a fluid hose 124.

Figure 6:
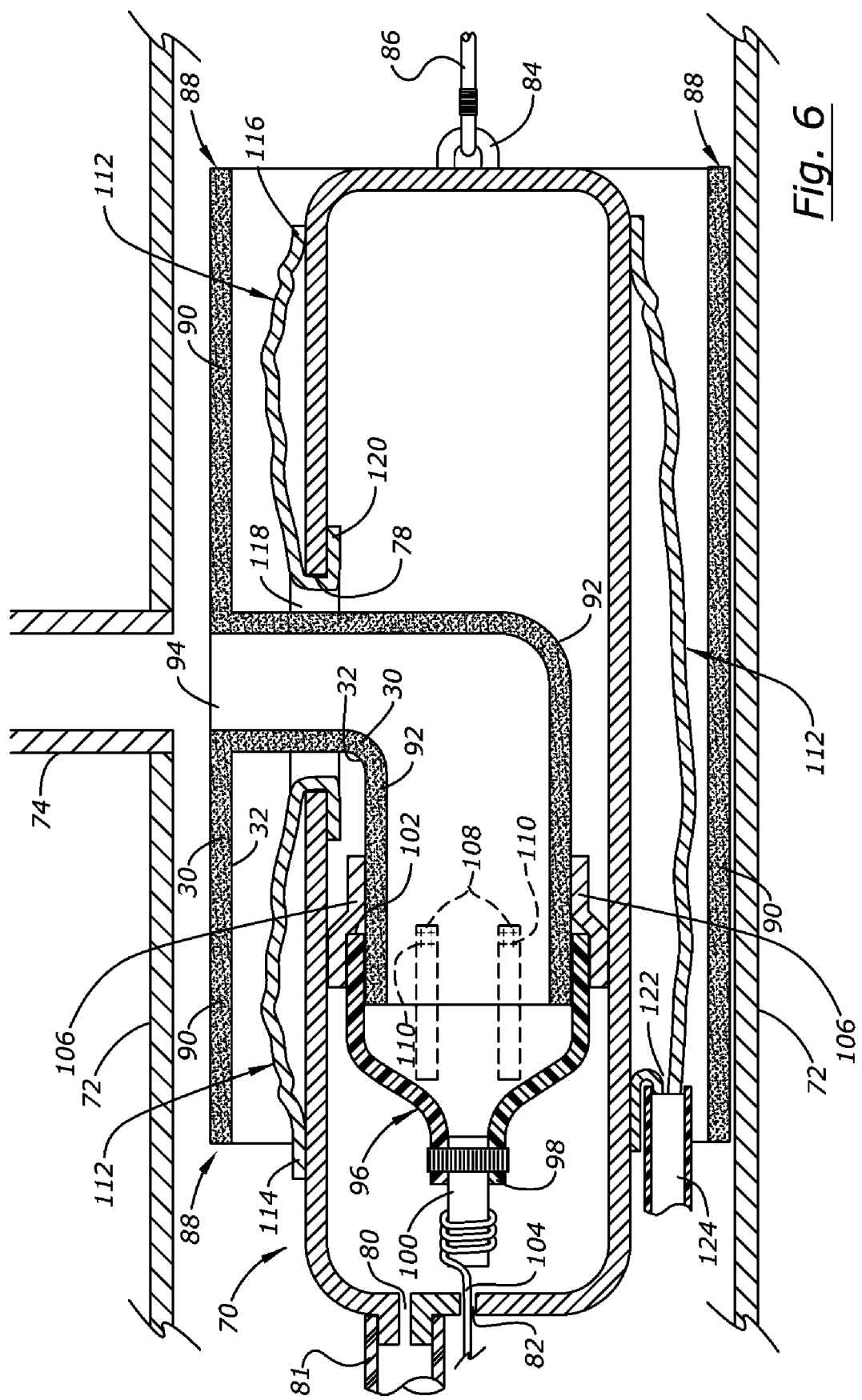
FIG. 6 is a sectional view showing the modification of FIG. 5 in a main pipeline and lateral pipeline junction.
Figure 7:
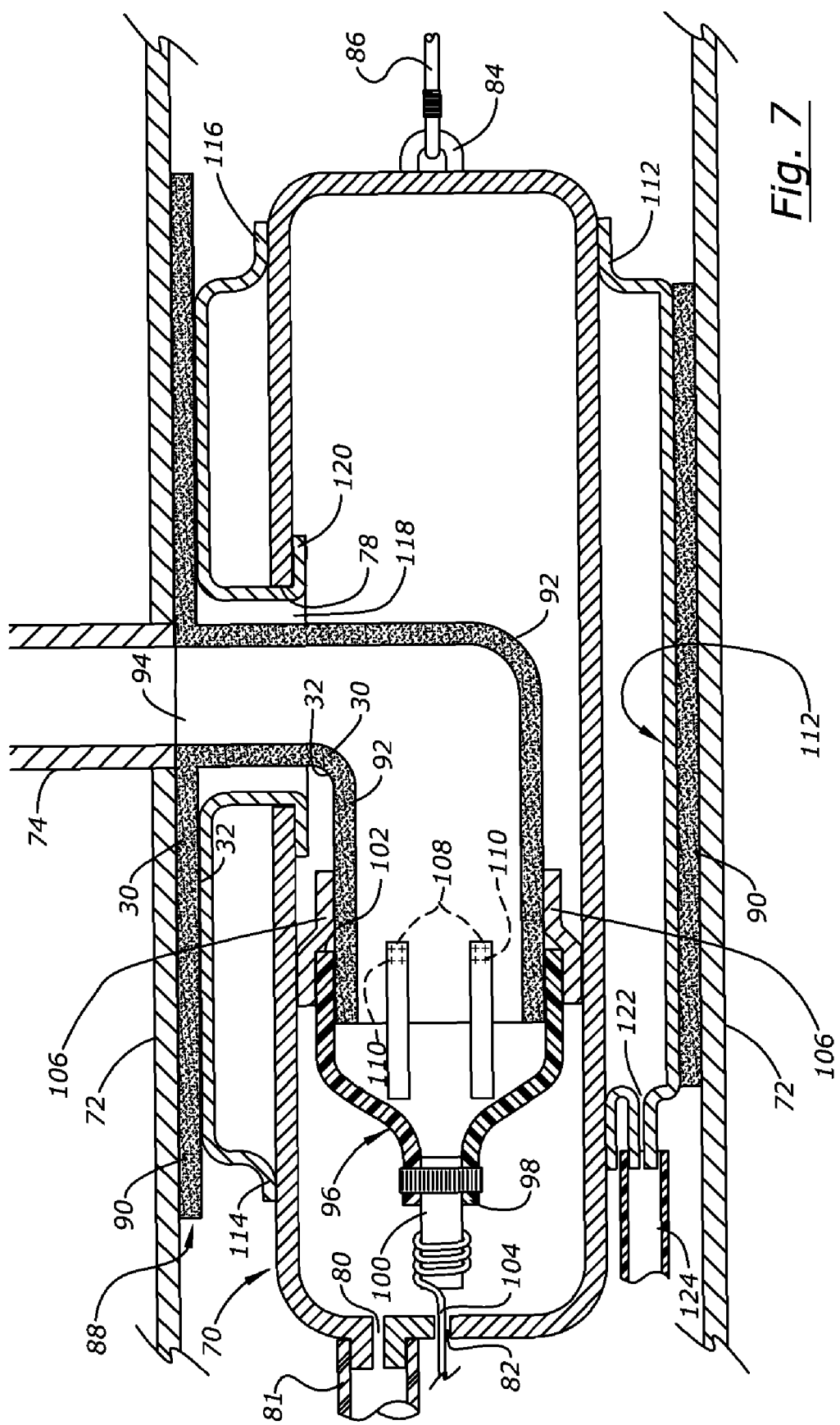
FIG. 7 is a view similar to FIG. 6, but showing the inflatable cuff in its inflated position.

In operation the assembly 70 is pulled by means of rope 86 to the appropriate position within the main pipeline 72 so that the launcher tube opening 78 is aligned with the lateral pipeline 74 as shown in FIG. 6. During this positioning step the inflatable cuff 112 is deflated so as to permit the assembly to move easily within the main pipeline 72.

Next, the hose 124 is used to introduce fluid such as air into the inflatable cuff 112 so as to cause it to expand radially outwardly and force the main liner member into tight engagement with the interior surface of the main pipeline 72. This properly positions the main liner member 90, and it also forms a seal between the main liner member 90 and the main pipeline 72.

Figure 8:
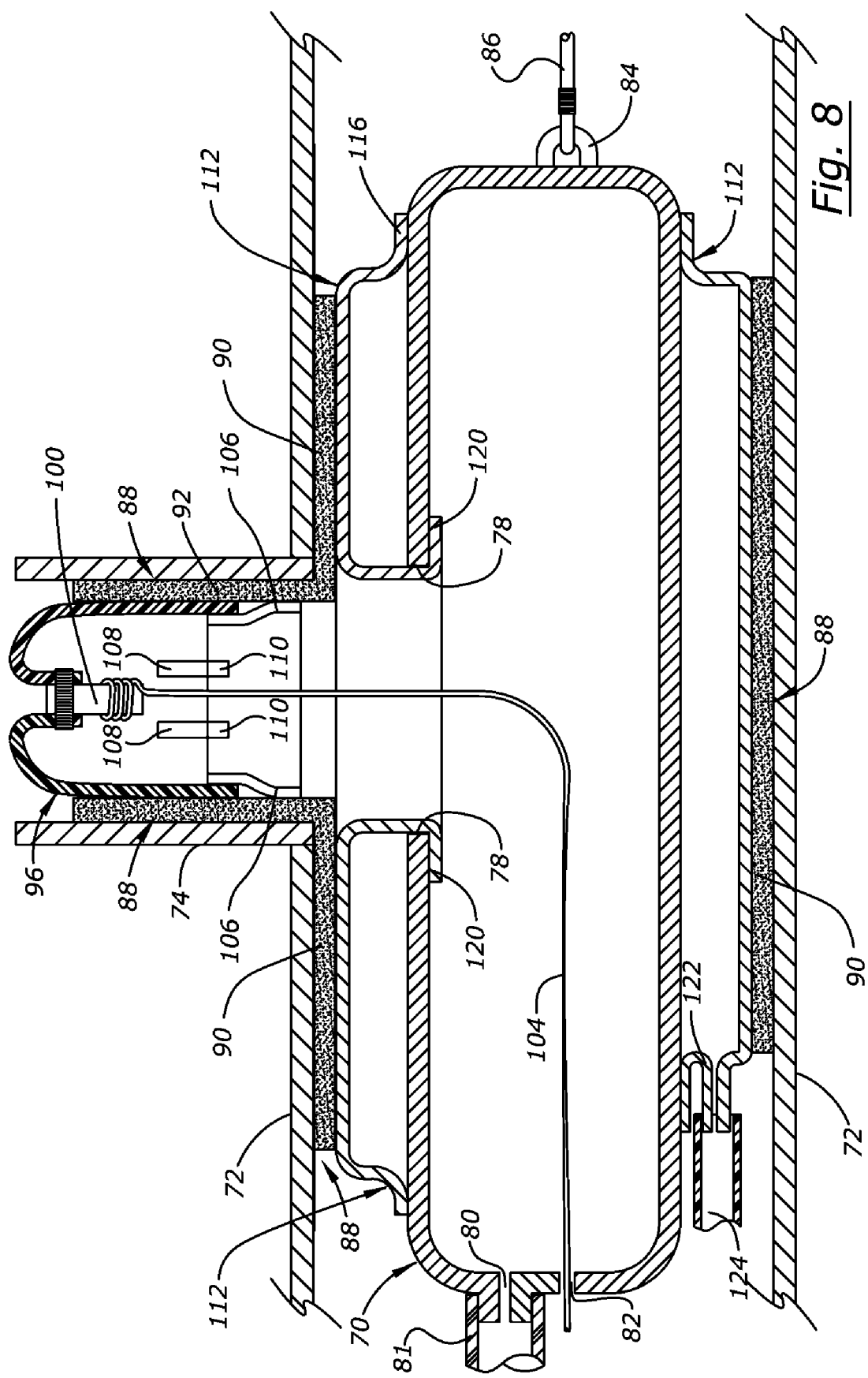
FIG. 8 is a view similar to FIGS. 6 and 7, but showing the lateral pipeliner in its inverted condition.

Next, air or other fluid is introduced through fluid conduit 81 into the interior of the steel launcher tube 76. This causes the lateral liner tube 92 to invert upwardly into the lateral pipeline as shown in FIG. 8. In this position the main liner member 90 and the lateral liner tube 92 form a T-shaped configuration 88.

Figure 9:
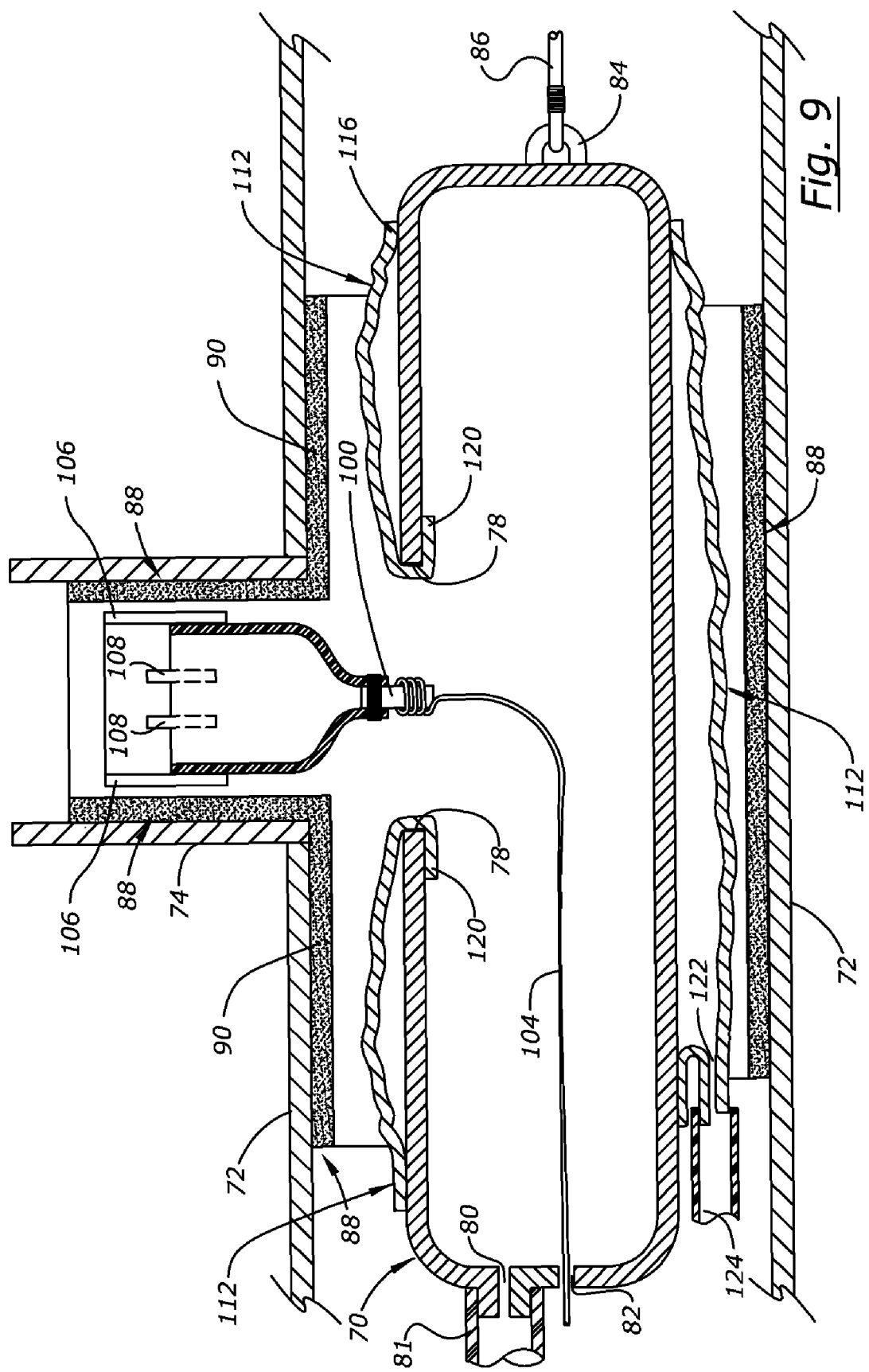
FIG. 9 is a view similar to FIG. 8, but showing the extension tube fully removed from the lateral pipe liner.

The resin is then permitted to cure and harden, and after the curing, the rope 104 is pulled to remove the extension tube 96 from the lateral liner tube 92 in the same manner as described for the embodiment shown in FIG. 1. FIG. 9 shows the extension tube 96 completely removed with the inflatable cuff 112 again deflated.

Figure 10:
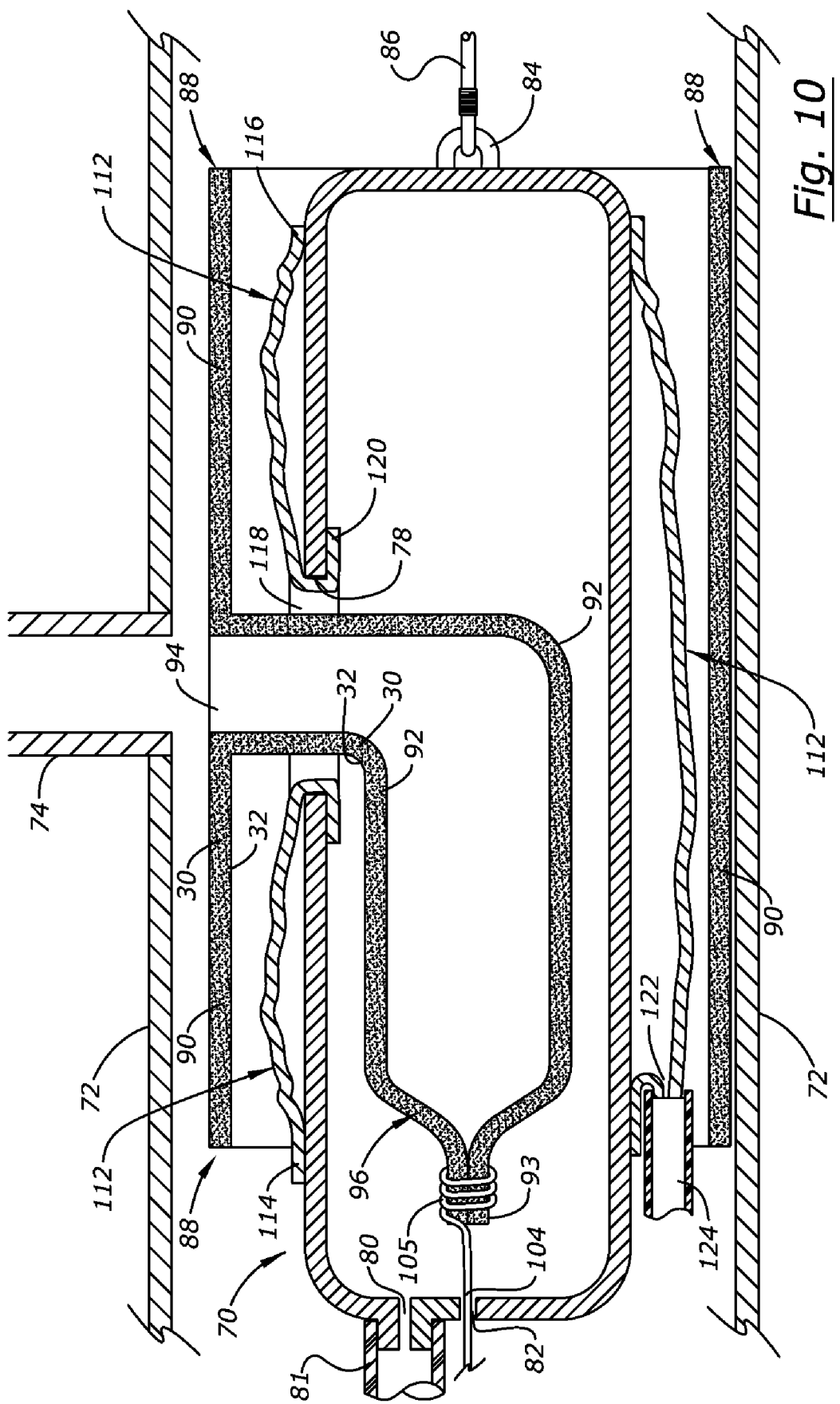
FIG. 10 is a sectional view similar to FIG. 6, illustrating an embodiment of the present invention without an extension tube.
Figure 11:
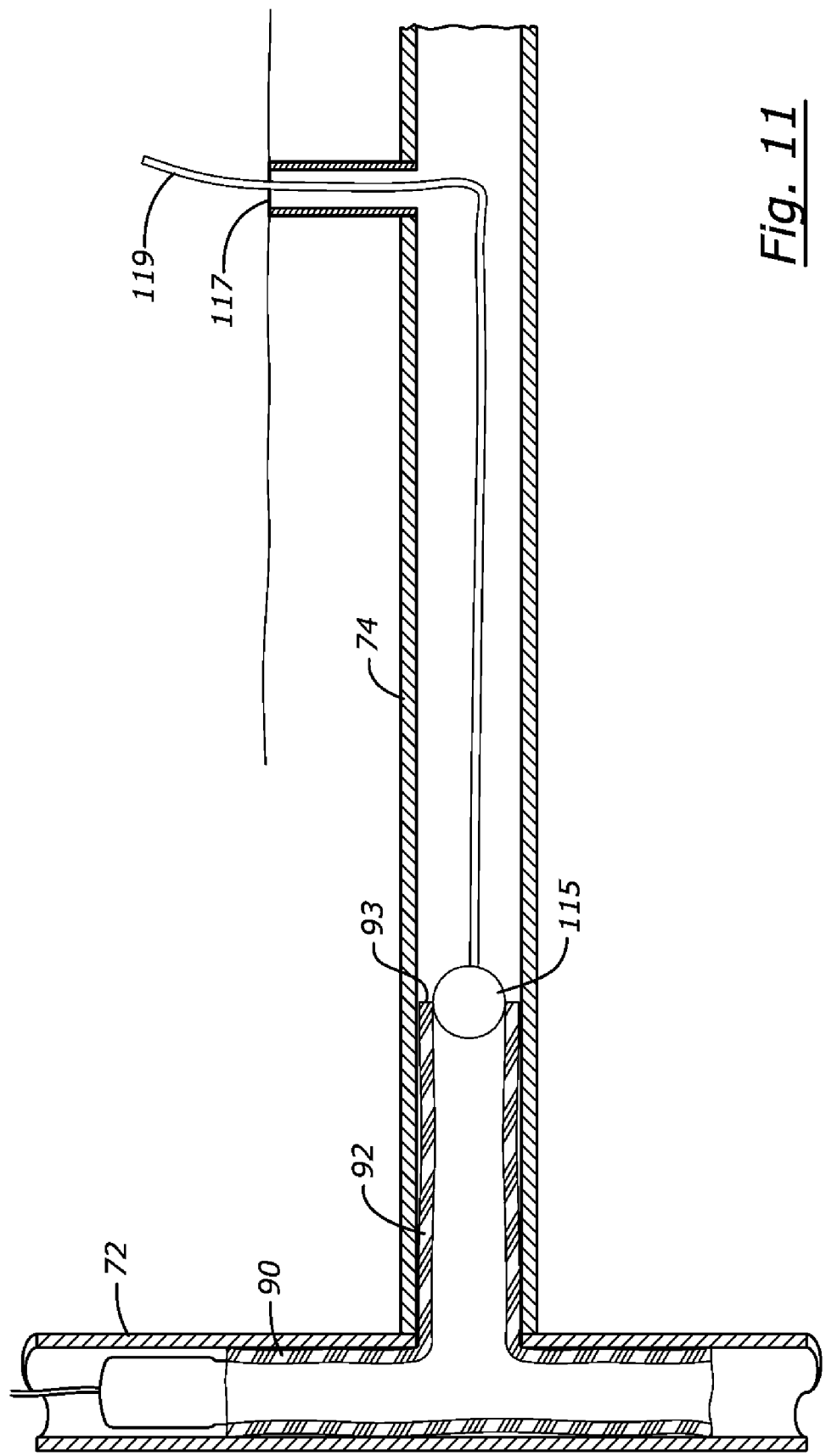
FIG. 11 is a sectional view showing the lateral liner tube completely inverted and sealed with an inflatable plug.

The present invention can also be practiced without an extension bladder. An exemplary embodiment is illustrated in FIGS. 10 and 11. Here, the end 93 of the lateral liner tube 92 opposite the main liner member 90 is temporarily closed, preferably by tying a rope 105 around the end 93 of the lateral liner tube 92. This creates a temporary seal at the end 93 of the lateral liner tube 92 during the inversion process. The rope 105 which is tied to the end 93 of the lateral liner tube 92 is also attached to line 104. The lateral liner tube 92 is pulled into the launcher tube 76 by pulling on the line 104. Inverting the lateral liner tube 92 causes the rope 105 that is tied to the end 93 of the lateral liner tube 92 to be pushed off by pressure applied within the lateral liner tube 92. This leaves the end 93 of the lateral liner tube 92 open with the lateral liner tube 92 in the inverted position. As shown in FIG. 11, the end 93 of the lateral liner tube is at a remote portion of the lateral pipe, such that the end 93 cannot be sealed or closed directly by an operator. To overcome this problem, a plug 115 is inserted (typically through a cleanout 117) in the end 93 of the lateral liner tube 92 (see FIG. 11). The plug 115 is inflated using a separate air hose 119 to form a seal at the end 93 of the lateral liner tube 92 so as to keep the liner tube 92 under pressure and inflated until the resin has cured. The plug 115 should include an exhaust port (not shown) for regulating the pressure and temperature inside the lateral liner tube 92. Upon curing of the resin, the plug 115 is deflated and removed. Those skilled in the art having the benefit of this disclosure will appreciate that tape, elastic bands, twine or the like may be substituted for the rope 105 as a means for temporarily closing the end 93 of the lateral liner tube 92.

Figure 12:
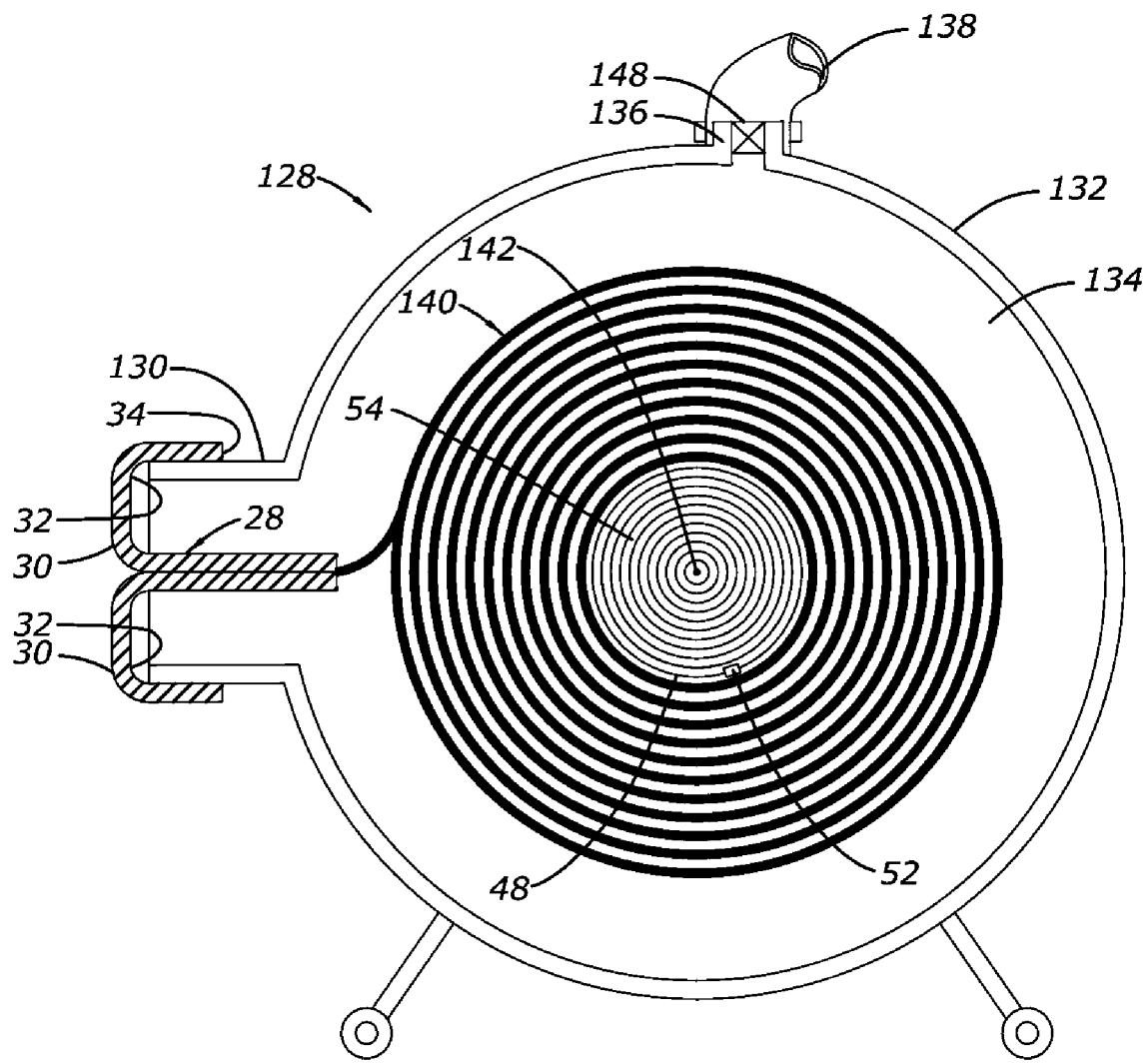
FIG. 12 is a sectional view showing a modified form of the inversion means which can be used for the present invention.
Figure 13:
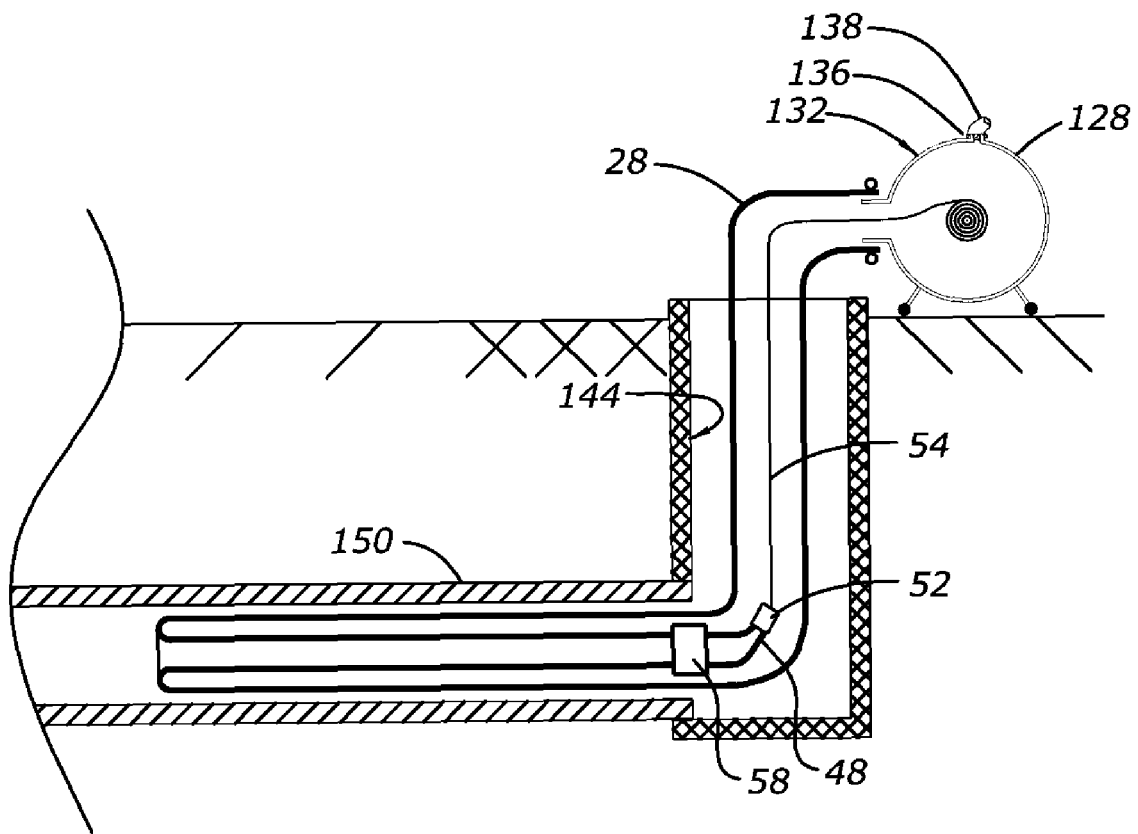
FIG. 13 is a sectional view of a manhole and pipeline utilizing the inversion means of FIG. 12 for inverting the pipeliner of the present invention.

FIGS. 12 and 13 illustrate a modified form of inversion means which can be used for inverting the liner tube of the present invention. The inversion means comprises a pressure tank 128 having a boss 130 thereon. A tank wall 132 encloses a tank chamber 134. A fluid inlet boss 136 is also provided and is connected to a fluid conduit 138 which is capable of introducing fluid under pressure into the tank chamber 134. A valve 148 is capable of opening and closing to permit the introduction or stopping of the fluid under pressure.

Within the tank chamber 134 is a liner tube coil 140 formed from a liner tube of the configuration shown in FIGS. 1-4 or 5-9. A pivot axle 142 is provided at the center. While shown only in a schematic form, the plug 52 and the extension tube 48 are also wound into the coil and are identified by numerals in FIG. 10. The flexible line 54 is wound at the center of the coil.

The end 34 of the liner tube 28 is folded over on the outside of the boss 130 so that when air is introduced under pressure into the tank chamber 134, the liner tube 128 inverts out of the boss 130 in the manner shown in FIG. 11. FIG. 11 shows a manhole 144 which is in communication with the main sewer line 150. The extension tube 48 is attached by means of tape 58 to the liner tube 28, and the line 54 extends outwardly and upwardly to the top of the manhole 144. After the inversion is complete, the line 54 is pulled to remove the extension tube from the cured liner tube.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. Apparatus for repairing a pipeline comprising:
    an elongated liner tube having a liner tube wall comprised of a resin absorbent material, said liner tube having at least first and second ends;
    said liner tube wall having first and second opposite wall surfaces;
    an uncured and unhardened resin impregnated in said resin absorbent material of said liner tube wall;
    an extension tube having a tube shaped open end and a closed end;
    a sealing member detachably securing said tube shaped open end of said extension tube to said first end of said liner tube, and forming a substantially fluid tight seal there between;
    inversion means connected to said second end of said liner tube for inverting said liner tube from an initial position wherein said first wall surface of said liner tube wall is facing in an inward radial direction and said second wall surface of said liner tube is facing in an outward radial direction to and inverted position wherein said first wall surface faces in an outward radial direction and said second wall surface faces in an inward radial direction.

2. Apparatus according to claim 1 further comprising a line being connected to said closed end of said bladder extension.

3. Apparatus according to claim 1 wherein said inversion means comprises a launcher device having first and second opposite launcher ends, a launcher device opening being located adjacent one of said first and second opposite ends, said second end of said liner tube being connected to said launcher device adjacent said launcher device opening to permit said liner tube to be inverted out of said launcher device opening.

4. Apparatus according to claim 1 wherein said inversion means comprises a launcher tank.

5. Apparatus according to claim 1 wherein said inversion means comprises a launcher device having first and second opposite launcher ends and a launcher device cavity, said launcher device having a launcher device opening located intermediate said first and second opposite launcher ends and providing communication to said launcher device cavity.

6. Apparatus according to claim 5 wherein said liner tube is T-shaped or Y-shaped and includes a main liner member and a lateral liner tube.

7. Apparatus according to claim 6 wherein said lateral liner tube is at least partially within said launcher device cavity and said main liner member is outside and surrounds said launcher device whereby introduction of fluid into said launcher device cavity will cause said lateral liner tube to be inverted out of said launcher device through said launcher device opening.

8. Apparatus according to claim 7 further comprising an inflatable bladder between said launcher device and said main liner member, a second fluid conduit being connected to said inflatable bladder for inflating said bladder and causing said bladder to exert pressure on said main liner member in an outward direction away from said launcher device.

9. Apparatus according to claim 1 wherein said sealing member comprises an adhesive material wrapped around said tube shaped open end of said bladder extension and said first end of said liner tube.

10. Apparatus according to claim 1 further comprising one or more tabs each having one end attached to said bladder extension and an opposite end detachably connected to said liner tube.

11. Apparatus according to claim 1 wherein said liner tube wall includes a plastic layer covering the outside of said liner tube when said liner tube is in said initial position, and said plastic layer being on the inside of said liner tube after said liner tube is inverted to said inverted position.

12. Apparatus for repairing a pipeline comprising:
    a launcher device having opposite closed ends and a liner tube opening intermediate said opposite closed ends, said launcher device having a fluid inlet therein;
    a liner assembly comprised of resin absorbing material capable of absorbing an uncured resin, said liner assembly comprising a main line portion and a lateral line portion;
    said main line portion having first and second opposite ends, being outside and at least partially surrounding said launcher tube, and having a lateral line opening intermediate said first and second opposite ends thereof;
    said lateral line portion having a first end connected to said main line portion at said lateral line opening, and extending through said liner tube opening in said launcher device to terminate in a second end disposed within said launcher device;
    an uncured resin impregnated within said absorbing material of said liner assembly;
    a bladder extension within said launcher device and having a first bladder extension end detachably connected to said second end of said lateral line portion of said liner assembly and a second bladder extension end that is closed;
    a fluid line connected to said fluid inlet of said launcher device and being connected to a source of fluid for introducing fluid under pressure to the interior of said launcher device to cause said lateral line portion of said liner assembly to invert out of said liner tube opening.

13. Apparatus according to claim 12 further comprising a line connected to said second bladder extension end and extending through said line opening of said launcher tube.

14. Apparatus according to claim 12 further comprising an inflatable bladder between said launcher device and said main liner member, said inflatable bladder being inflatable from a deflated condition to an inflated condition to force said main liner member in a radial direction away from said launcher device.

15. Apparatus according to claim 12 further comprising a second fluid line for introducing fluid pressure to said inflatable bladder independently of said first mentioned fluid line.

16. Apparatus according to claim 12 wherein said lateral line portion and said main line portion of said liner assembly are shaped in the form of a tube.

17. Apparatus according to claim 12 wherein said main line portion and said lateral line portion of said liner assembly each having a plastic coating.

18. A method for repairing a pipeline comprising:
taking a liner tube having first and second opposite liner tube ends and a liner tube wall comprised of an absorbent material capable of absorbing an uncured resin, said liner tube wall having first and second opposite wall surfaces;
attaching a tube shaped end of an extension tube to said second liner tube end, said extension tube having a closed end opposite from said tube shaped end, the extension tube being shorter in length than the liner tube;
impregnating said absorbent material of said liner tube wall with an uncured resin;
attaching an inversion means to said first liner tube end;
using said inversion means to invert said liner tube in said pipeline from an initial position wherein said first wall surface of said liner tube faces in an inward radial direction and said second wall surface of said liner tube faces in an outward radial direction, to an inverted position wherein said first wall surface of said liner tube faces in an outward radial direction and said second wall surface faces in an inward radial direction;
permitting said resin to cure and harden;
pulling said extension tube away from said liner tube to detach said extension tube from said liner tube.

19. The method according to claim 18 wherein the closed end of the extension tube is closed after the liner tube is impregnated with an uncured resin.

20. The method according to claim 18 wherein said attachment step comprises using a sealing member to attach said liner tube to said extension tube.

21. The method of claim 20 wherein said step of pulling said extension tube away from said liner tube further comprising detaching said sealing member from said liner tube while keeping said sealing member attached to said extension tube.

22. The method according to claim 18 wherein said inversion means comprises a launcher device and said method further comprises keeping a portion of said liner tube within said launcher device before said inverting step.

23. The method according to claim 22 further comprising using a T-shaped or Y-shaped liner assembly having a main liner portion and a lateral liner portion.

24. The method according to claim 23 wherein said pipeline comprises a main pipeline and a lateral pipeline which forms a juncture with said main pipeline, said method further comprising placing said main liner portion outside said launcher device and said lateral liner portion inside said launcher device before said inverting step, said inverting step further comprising inverting said lateral liner portion out of said launcher device through a launcher device opening in said launcher device into said lateral pipeline.

25. The method according to claim 22 wherein said launcher device includes a launcher opening, and said inverting step comprises inverting said liner tube through said launcher opening.

26. The method according to claim 18 wherein the liner tube wall includes a plastic covering being on the inside of the liner tube after the liner tube is inverted.

27. A method for repairing a main pipe and a lateral pipe connected thereto and in communication therewith to form a pipe joint, the method comprising:
taking a liner assembly including a main liner member and a lateral liner tube having first and second opposite liner tube ends and a liner tube wall including an absorbent material capable of absorbing an uncured resin, the liner tube wall having first and second opposite wall surfaces, and the first end of the lateral liner tube joined with the main liner member;
impregnating the liner assembly with an uncured resin;
sealing the second end of the lateral liner tube so as to cause the lateral liner tube to inflate when pressurized by a fluid;
moving the liner assembly within the main pipe to a position where the first end of the lateral line tube is adjacent the pipe joint;
inflating the main liner member against the main pipe;
inverting the lateral liner tube in the lateral pipe from an initial position wherein the first wall surface of the lateral liner tube faces in an inward radial direction and the second wall surface of the lateral liner tube faces in an outward radial direction, to an inverted position wherein the first wall surface of the lateral liner tube faces in an outward radial direction against the lateral pipe and the second wall surface faces in an inward radial direction;
opening the second end of the later liner tube at a remote location of the lateral pipe;
inserting a plug into the second end of the lateral liner;
pressurizing the lateral liner tube with a fluid; and
allowing the resin to cure and harden.

28. The method of claim 27 wherein the lateral liner tube wall includes a plastic layer being on the inside of the lateral liner tube after the lateral liner tube is inserted.

29. The method of claim 27 wherein the second end of the lateral liner tube is sealed by attaching a tube shaped end of an extension tube to the second end of the lateral liner tube prior to inverting the lateral liner tube, the extension tube having a closed end opposite from the tube shaped end.

30. The method of claim 27 wherein the plug is an inflatable plug.

31. The method of claim 30 wherein the inflatable plug is inflated after being inserted into the second end of the lateral liner tube.

32. The method of claim 31 wherein the inflatable plug is deflated and removed from the second end of the liner tube after the resin has cured and hardened.

33. The method of claim 27 wherein the second end of the liner tube is synched together prior to inverting the lateral liner tube into the pipeline.

34. The method of claim 27 wherein the main liner member is formed in the shape of a tube.

35. A method of repairing a main pipe and a lateral pipe line connected thereto and in communication therewith to form a pipe joint; the method comprising:

taking a liner assembly including a main liner member and a lateral liner tube in communication with one another through a liner juncture, the lateral liner tube having a first end at the liner juncture and an opposite second end and a liner tube wall having first and second opposite wall surfaces;

impregnating the liner assembly with a material capable of curing and hardening;

temporarily closing the second end of the lateral liner tube so as to cause the lateral liner tube to inflate when pressurized by a fluid;

moving the liner assembly through the main pipe to a position where the liner juncture is adjacent the pipe joint;

inflating the main line member;

inverting the lateral liner tube into the lateral pipe from an initial position wherein the first wall surface of the lateral liner tube faces in an inward radial direction and the second wall surface of the liner tube faces in an outward radial direction to an inverted position wherein the first wall surface of the lateral liner tube faces in an outward radial direction against the lateral pipe and the second wall surface faces in an inward radial direction;

opening the second end of the lateral liner tube;

inserting an inflatable plug into the open second end of the liner tube;

pressurizing the lateral liner tube; and allowing the resin to cure and harden.

36. The method of claim 35 wherein the lateral liner tube and the main liner member are inflated independently.

37. The method of claim 35 wherein the main liner member is shaped in the form of a tube.

38. The method of claim 35 wherein the second end of the lateral liner tube is temporarily closed after the liner assembly is impregnated with the material capable of curing and hardening.

39. The method of claim 35 wherein the lateral liner tube having a plastic covering being on the inside of the lateral liner tube after the lateral liner tube is inverted.

40. The method of claim 39 wherein the main liner member includes a plastic covering.

41. Apparatus for repairing a pipeline comprising:

an elongated liner tube having a liner tube wall comprised of a resin absorbent material, said liner tube having at least first and second ends;

said liner tube wall having first and second opposite wall surfaces;

an uncured and unhardened resin impregnated in said resin absorbent material of said liner tube wall;

an extension tube having a tube shaped open end and a closed end;

a sealing member detachably securing said tube shaped open end of said extension tube to said first end of said liner tube, and forming a substantially fluid tight seal there between;

inversion means connected to said second end of said liner tube for inverting said liner tube from an initial position wherein said first wall surface of said liner tube wall is facing in an inward radial direction and said second wall surface of said liner tube is facing in an outward radial direction to and inverted position wherein said first wall surface faces in an outward radial direction and said second wall surface faces in an inward radial direction;

wherein said sealing member comprises an adhesive material wrapped around said tube shaped open end of said bladder extension and said first end of said liner tube;

one or more tabs each having one end attached to said bladder extension and an opposite end detachably connected to said liner tube.

42. Apparatus for repairing a pipeline comprising:

an elongated liner tube having a liner tube wall comprised of a resin absorbent material, said liner tube having at least first and second ends;

said liner tube wall having first and second opposite wall surfaces;

an extension tube having a tube shaped open end and a closed end;

a sealing member detachably securing said tube shaped open end of said extension tube to said first end of said liner tube, and forming a substantially fluid tight seal there between;

one or more tabs each having one end attached to said extension tube and an opposite end detachably connected to said liner tube.

43. A method for repairing a pipeline comprising:

taking a liner tube having first and second opposite liner tube ends and a liner tube wall comprised of an absorbent material capable of absorbing an uncured resin, said liner tube wall having first and second opposite wall surfaces;

attaching a tube shaped end of an extension tube to said second liner tube end, said extension tube having a closed end opposite from said tube shaped end, the extension tube being shorter in length than the liner tube;

impregnating said absorbent material of said liner tube wall with an uncured resin;

inverting said liner tube in said pipeline from an initial position wherein said first wall surface of said liner tube faces in an inward radial direction and said second wall surface of said liner tube faces in an outward radial direction, to an inverted position wherein said first wall surface of said liner tube faces in an outward radial direction and said second wall surface faces in an inward radial direction;

permitting said resin to cure and harden;

pulling said extension tube away from said liner tube to detach said extension tube from said liner tube.

\* \* \* \* \*